April 25, 1950 P. C. BOREL ET AL 2,504,959

LINE CLASS DETECTING SYSTEM

Filed June 19, 1946 4 Sheets-Sheet 1

INVENTORS
P. C. Borel
M. R. Mauge
BY Robert Harding Jr
ATTORNEY

April 25, 1950 P. C. BOREL ET AL 2,504,959

LINE CLASS DETECTING SYSTEM

Filed June 19, 1946 4 Sheets-Sheet 2

INVENTORS
P. C. Borel
M. R. Mauge
BY Robert Harding Jr.
ATTORNEY

LINE CLASS DETECTING SYSTEM

Filed June 19, 1946

INVENTORS
P. C. Borel
M. R. Mauge
BY Robert Harding Jr.
ATTORNEY

INVENTORS
P. C. Borel
M. R. Mauge
BY Robert Harding Jr.
ATTORNEY

Patented Apr. 25, 1950 2,504,959

UNITED STATES PATENT OFFICE 2,504,959

LINE CLASS DETECTING SYSTEM

Pierre Charles Borel and Marcel Roger Mauge, Boulogne-Billancourt, France, assignors to International Standard Electric Corporation, New York, N. Y., a corporation of Delaware Application June 19, 1946, Serial No. 677,674
In France March 27, 1945

Section 1, Public Law 690, August 8, 1946
Patent expires March 27, 1965

14 Claims. (Cl. 179—18)

This invention relates to line class detecting systems, particularly wherein it is desirable to recognize, from the register of an exchange, the characteristics of the calling and of the called lines, regardless of the number of characteristics involved in the operation of the systems.

These characteristics can be defined and, in the present state of telephone operation, the distribution may be as follows: For calling lines, a distinction may be made between unlimited-service lines, limited-service lines and absent-subscriber service lines; for called lines, a distinction may be made between the first lines of private branch exchanges (P. B. X's), the intermediate and the final lines of such exchanges, absent-subscriber service lines, transferred lines, and unused lines. It may, however, become necessary to provide other characteristics and, for example, it might be useful to create different classes of service restriction, to discriminate as between whether the called line belongs to a cancelled subscriber or has a number for which the putting through of the call requires a new routing, etc.

In systems where the characteristic of the subscriber line cannot be detected by the register, certain calls must be handled from the subscriber's line, for absent subscribers, for example; but such operation is always costly and requires complex equipment.

The object of this invention is, therefore, to provide an arrangement that will allow the indication and discrimination of an indefinite number of subscriber line characteristics.

With this object in view, a feature of the invention resides in characterizing the different subscriber lines by means of a connection of one of the line circuit wires to a characteristic point of all the registers. Where the line characteristic belongs to a P. B. X group of lines in which a free hunting must be effected, a further feature of the invention resides in means for preventing wrong indications of the final line in the P. B. X group.

There are other features forming a part of the invention which, however, will be pointed out in the course of the ensuing description, reference being had to the accompanying drawings, in which.

Figure 4:
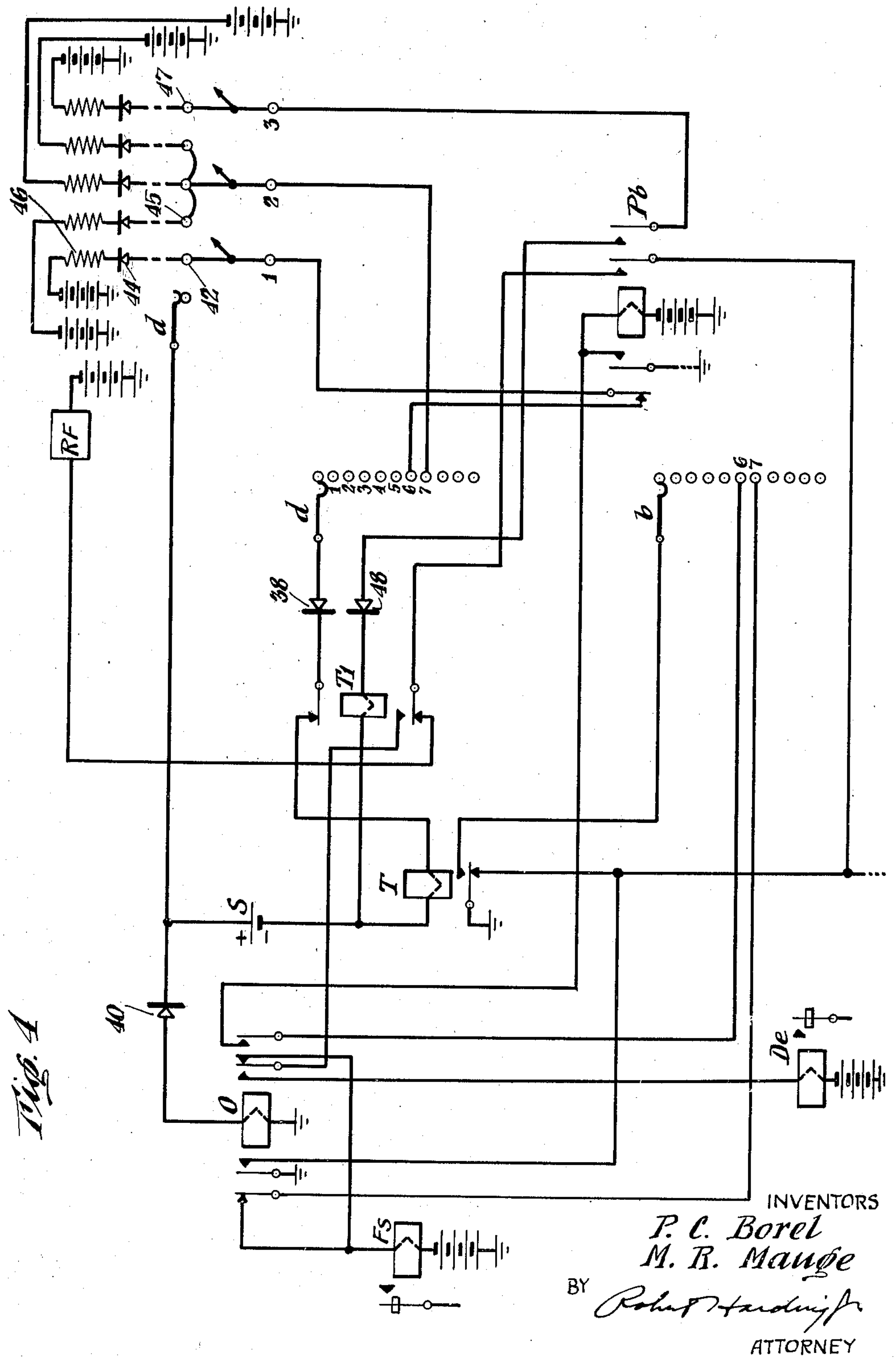
Figure 6:
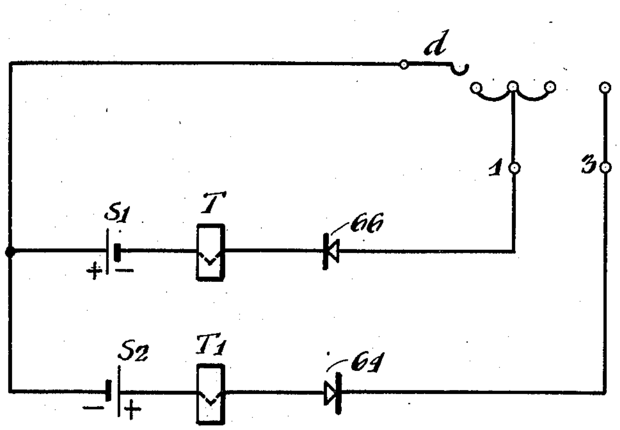
Figure 5:
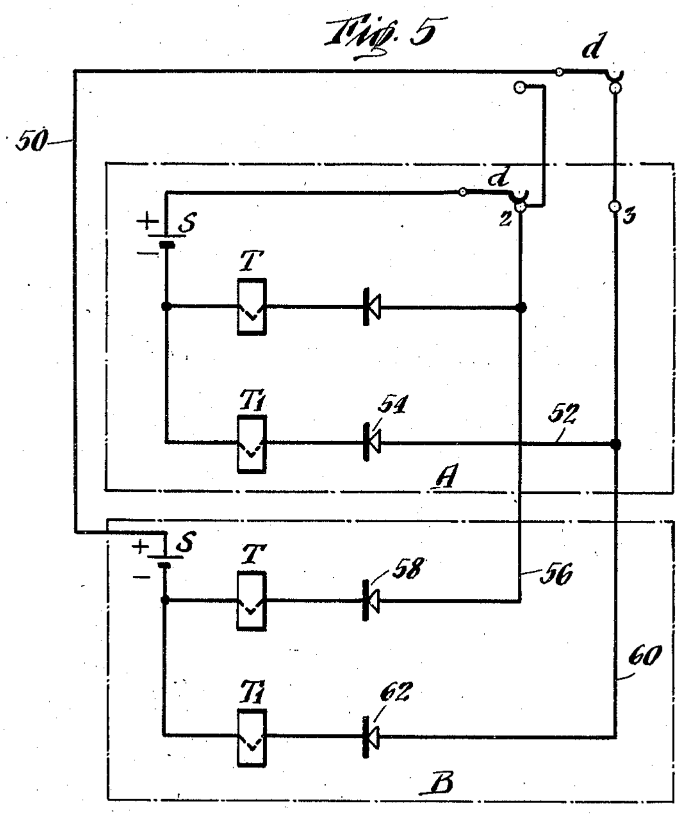

Fig. 4 shows an example of a circuit that, according to features of the invention, will provide the hunting of a free line in a P. B. X group;

Fig. 5 shows the circuits established when two P. B. X huntings occur simultaneously; and Fig. 6 shows an arrangement given as a variation of the one shown in Fig. 4.

Figures 1, 2:
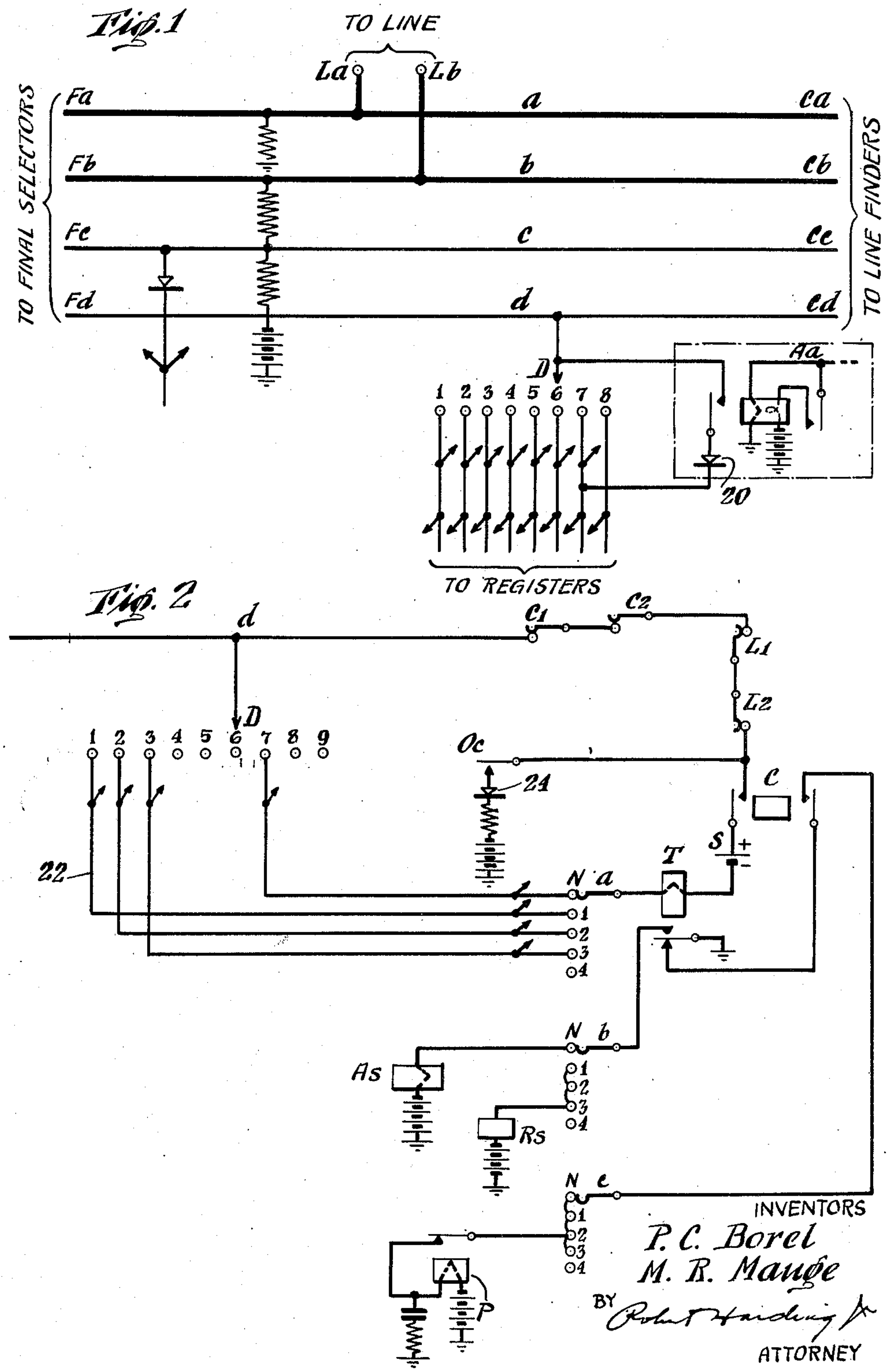
Fig. 1 shows a line circuit without line or cut-off relays and incorporating certain features of the invention.
Fig. 2 shows an example of a device used in embodying the invention, for detecting the characteristic of a calling line.

Referring now to Fig. 1, it should be understood that the case shown of a line circuit having no line or cut-off relays is given only by way of illustration and that the invention could also be readily applied to line circuits comprising such relays. Thus, in this figure, the outside line is connected to terminals *La* and *Lb*; the connection with the final selectors is provided by wires *Fa*, *Fb*, *Fc*, and *Fd*; while the connection with the line finders is provided by wires *Ca*, *Cb*, *Cc*, and *Cd*.

Conductors *a* and *b* are used for establishing the talking circuit. Conductor *c* serves to neutralize the starting through connection of this wire to a potential of —48 volts, for example. Conductor *d* is used, on the one hand, to characterize the busy condition of the line through the connection of this conductor to a characteristic potential connected by the selector that has seized the line and, on the other hand, to characterize the type of line through the connection provided between point D and one of the terminals 1 to 8.

To simplify the description, the number of line characteristics has been assumed to be eight; but, as will be seen from the description of the operation, this number may be increased at will without any difficulty.

In the example described, point D is connected:

To terminal 1, for a first restricted-service P. B. X line;
To terminal 2, for a plain or an intermediate retricted-service P. B. X line;
To terminal 3, for a final P. B. X. group line;
To terminal 4, for a first unlimited-service P. B. X group line;
To terminal 5, for a plain or an intermediate unlimited-service P. B. X line;
To terminal 6, for a final unlimited-service P. B. X group line;
To terminal 7, for an absent-subscriber service line; and
To terminal 8, for a transferred subscriber line.

For absent subscribers under special contract, the connection between the point D and terminal 7 is provided by relay *Aa*, whose control depends upon a device peculiar to the system used. In this case, the connection is provided across a rectifier cell 20 to prevent different terminals from being connected among themselves across the contacts of special operated *Aa* relays.

Terminals 1 to 8 are connected to corresponding terminals of the registers (not shown) of the exchange.

Fig. 2 shows an example of a device for detecting the characteristic of a calling line. This example in no way limits the possibilities of incorporation of the invention, and any other switching means could be used for the same purpose. Wipers C1, C2, L1, and L2 represent, respectively, the wipers of the first finder, of the second finder, and of the link-circuit finders establishing the connection between the *d* conductor of the calling line and the register.

When the connection is provided between the calling line and the register, relay C of the register is operated in a manner well-known in the telephone switching art. In operating, relay C at its right front contact closes an operating circuit for step-by-step switch P, which may be traced from ground over the back contact of relay T, right front contact of relay C, normal contact N of bank *c*, and thence through back contact and winding of switch P to grounded battery; at its left front contact relay C connects relay T in series with an individual current source S over the *d* conductor of the calling line. This current source may be a charged condenser, or any other current source, transformer winding, alternating current rectifier, etc. Relay T is also connected through the normal contact N of bank *a* of step-by-step switch P to contact 7 of the line circuits.

If the line involved is in absent subscriber service condition, its *d* conductor is connected to terminal 7 and the circuit of relay T is closed. Relay T operates and at its back contact interrupts the hereinbefore-traced operating circuit for switch P, and at its front contact closes an operating circuit for absent-subscriber relay A*s* through bank *b* of step-by-step switch P. However, if the calling line is not in absent-subscriber service, relay T remains unoperated and step-by-step switch P, in accordance with the hereinbefore-traced operating circuit, steps from its normal or home position to position 1.

In position 1 of step-by-step switch P, relay T is connected to contact 1 of the line circuits; if the line involved is a first restricted service P. B. X group line, the *d* conductor is connected to contact 1 and relay T operates in a circuit that can be traced from positive terminal of source S, through left front contact of relay C, finder switches L2, L1, C2, and C1, over conductors *d* and D, through contact 1, conductor 22, switch position 1 of bank *a*, and thence through winding of relay T to negative terminal of source S. Relay T, in operating, at its back contact interrupts the operating circuit for switch P and closes an obvious operating circuit for restricted-service relay R*s*. In case the line considered is not a first restricted-service P. B. X line, relay T remains unoperated and step-by-step switch P steps from position 1 to position 2.

In position 2, the same test is made to check whether the line involved is or is not a plain restricted-service line (connection with line terminal 2). In position 3, the test is repeated to verify the connection with line terminal 3. If relay T operates in either of positions 1, 2, or 3, restricted-service relay R*s* is operated.

Relays A*s* and R*s* assure the register a particular operation, which will not be described, being already known and beyond the scope of the present invention.

Independently of the operation of relay T, the *d* conductor of the calling line is connected to back contact O*c* and thence to a potential of —48 volts to characterize the busy condition of this line. This potential is connected to the *d* conductor in series with a rectifier cell 24, in order to prevent connecting several characteristic terminals among themselves across several contacts O*c*, these contacts having a common point at the supply battery.

Figure 3:
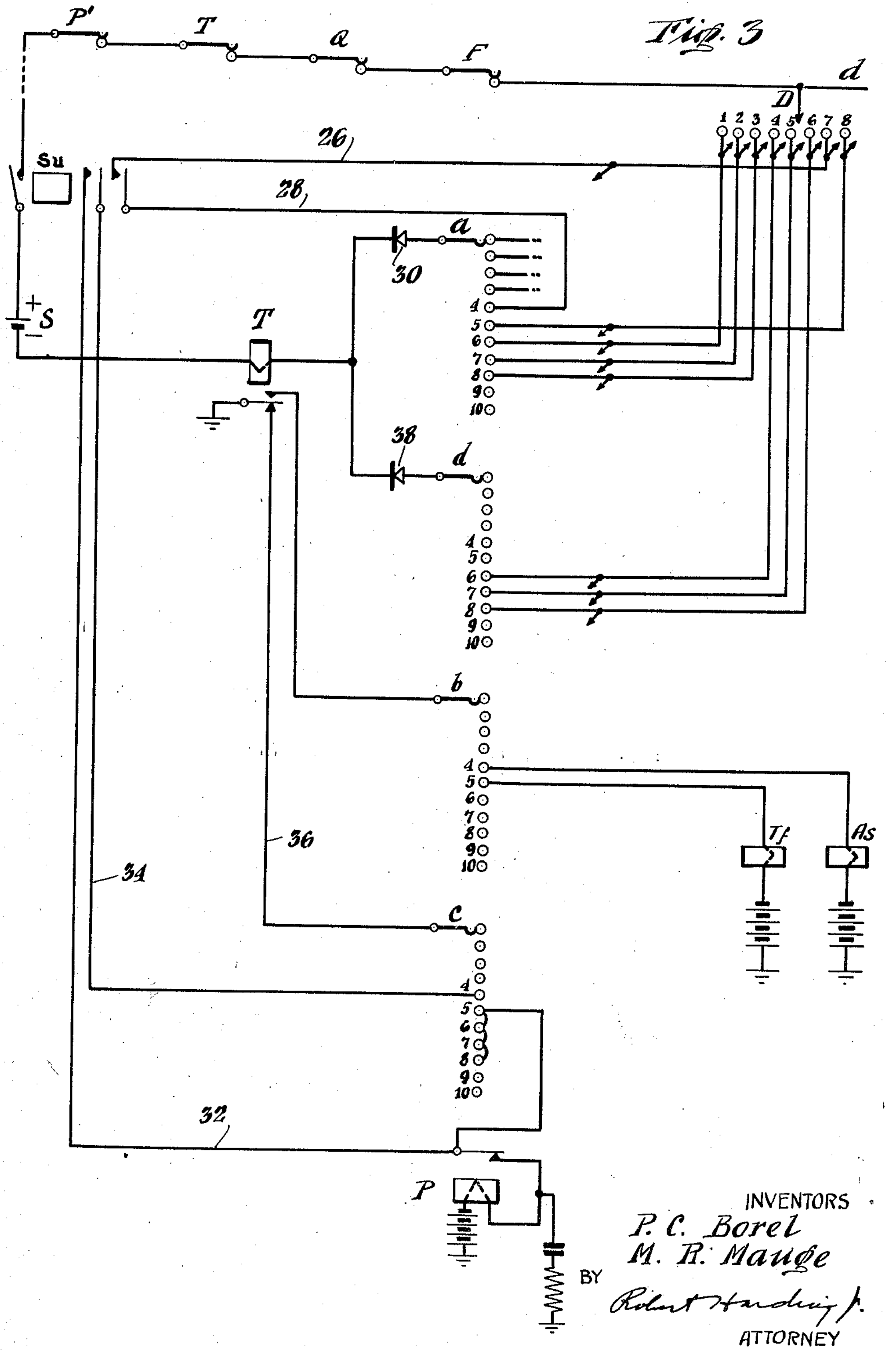
Fig. 3 shows an example of a device used in embodying the invention, for detecting the characteristic of a called line.

In Fig. 3 is shown an example of a device that allows for detecting the characteristic of the called line. The called line is connected to the register through a final selector, a fourth selector, a third selector, and a first selector. The wipers of these selectors, providing the connection between the conductor *d* of the called line and the register, are shown and designated respectively by the reference letters F. Q. T. and P. In order to locate the final selector, it is assumed that end-of-units-selection relay S*u* is operated in the register and that step-by-step switch P is in position 4. Wipers *a*, *d*, *b*, and *c* of switch P will then be in engagement with the corresponding contacts 4 thereof. Relay S*u* at its left front contact connects relay T between the conductor *d* of the line involved anad contact 7 of the line circuit. If the line seized is in absent-subscriber service, relay T operates in a circuit that may be traced from positive terminal of source S, through left front contact of relay S*u*, selector switch wipers P′, T, Q, and F, over conductors *d*, D, contact 7, over conductor 26, through outer right front contact of relay S*u*, and thence over conductor 28, through contact 4 of wiper *a*, rectifier 30, and winding of relay T to negative terminal of source S. Relay T, in operating, through its front contact connects ground over contact 4 of wiper *b* to relay A*s*, which operates. If the line involved is not connected to contact 7, relay T remains unoperated and step-by-step switch P′ advances from position 4 to position 5. The operating circuit for switch P′ may be traced from grounded battery, through the winding and back contact thereof, conductor 32, through inner front contact of relay S*u*, conductor 34, contact 4 of bank *c*, and thence over conductor 36 and back contact of relay T to ground.

In position 5 of step-by-step switch P′, relay T is connected so as to operate if the line involved belongs to a transferred subscriber (line contact 8), a fact that is recorded by the pulling up of transferred-subscriber relay T*f*. If the line involved does not belong to a transferred subscriber, step-by-step switch P′ advances under the control of relay T, unoperated, from position 5 to position 6 where a test is made to determine whether the subscriber line is a first line of a P. B. X group.

The first P. B. X group line may be characterized by a connection with line contact 1 or with line contact 4, according to whether the line is a restricted-service or an unlimited-service line, relay T being connected to these two contacts through banks *a* and *d* of step-by-step switch P.

To prevent the coupling of the two line contacts 1 and 4, rectifier cells 30 and 38 are used. By the same method as hereinbefore-described, a test is made in positions 7 and 8 of step-by-step switch P to determine whether the line involved is a plain or an intermediate P. B. X group line or a final P. B. X group line. The operation of the device is easily deduced from the foregoing description. If relay T does not operate for any of the tests made, the line is not used and the register operates in a manner that is peculiar to it for calls of this type. Likewise, the operation of relays As and Tf causes a special operation of the register, an operation that will not be described here, since it does not form a part of the invention.

For each line equipment, the connection between the conductor *d* at one of the points characterizing the different types of lines may be effected in any desirable manner, for example, with the aid of cartridges (not shown) differing in color, or by means of an omnibus cartridge in which the contact that must provide the connection with the desired point can be displaced and fixed in a numbered housing corresponding to this point. The relative position of the contact pin will indicate immediately for each cartridge the type of the corresponding line.

In Fig. 4 is shown an example of a circuit designed to provide free hunting in a P. B. X group when the preceding device of Fig. 3 has determined a line characteristic of this type. This example is not limitative and any other switching device could be used; for example, the characteristic of a busy line that is verified by the operation of a relay could, contrariwise, be characterized by the non-operation of a relay.

Referring now to Fig. 4, there is shown the connection of a final selector to the first line of a subscriber with five grouped lines. The final selector is indicated by its magnet RF and by its wiper *d*, providing the connection with the *d* wire of the subscribed line. Step-by-step switch P is indicated in this figure by banks *d* and *b*. If all of the lines in the group are busy, they will be connected to a potential of −48 volts. Assuming that step-by-step switch P is now in position 6 and that wiper *d* of the final selector is connected to line contact 1, which constitutes a first P. B. X line, this busy characteristic causes the operation of relay O of the register, which may be traced from ground, through winding thereof, rectifier 40, wiper *d*, in engagement with contact 42, and thence through rectifier 44 and resistance 46 to grounded battery. Relay T also operates in a circuit that may be traced from positive terminal of source S, through wiper *d* of the final selector, terminal 42, terminal 1, left back contact of relay Pb, contact 6 of bank *d*, through rectifier 38, upper back contact of relay T1, and thence through winding of relay T to negative terminal of battery. Relay T, in operating, at its back contact opens an energizing circuit for the step-by-step switch P and at its front contact closes an energizing circuit for relay Pb, which may be traced from grounded battery, through winding thereof, outer right front contact of operated relay O, terminal 6 of bank *b*, and thence to ground over front contact of relay T. Relay O, in operating, at its left front contact completes an energizing circuit for driving magnet RF, which may be traced from grounded battery through winding thereof, back contact of relay T1, inner right front contact of relay Pb and thence to ground through left front contact of relay O. Selector driving magnet RF then operates and connects wiper *d* thereof to terminal 45.

Relay Pb, in operating, at its right front contact performs no useful function at this time, at its inner left front contact provides an obvious locking circuit for itself, and at its left back contact opens the hereinbefore-traced operating circuit for relay T. Relay T releases and causes step-by-step switch P to step from position 6 to position 7, as indicated in Fig. 3. In position 7, relay T is connected to line contact 2, corresponding to all of the intermediate lines of the P. B. X group. Relay T1 is connected through outer right front contact of relay Pb to line contact 3, corresponding to the final P. B. X lines.

Relay T operates when the *d* wiper of the selector is connected with the *d* conductor of an intermediate P. B. X line and relay O operates when that line is busy, in a manner similar to that described hereinbefore. It is thus clear that the rotation continues until a free line is found.

If a free line is found, relay T operates and relay O remains unoperated. Under these conditions, as shown in Fig. 4, the circuit of end-of-selection relay Fs is closed and the circuit of magnet RF is opened. The circuit for relay Fs may be traced from grounded battery through the winding thereof, through outer left bank contact of relay O, through terminal 7 of contact bank *b*, and thence through front contact of relay T to ground. Relay Fs is slow to operate in order to allow the time required for the operation of relay O, should the line be busy. If all the lines in the group are busy, the final selector reaches the final line in the group, causing, through line contact 3, the operation of relay T1, and, through the busy battery, the operation of relay O. The operating circuit for relay T1 may be traced from positive terminal of source S through selector wiper *d*, contact 47, line terminal 3, right front contact of relay Pb, rectifier 48, and thence through winding of relay T1 to negative terminal of source S. Relay T1, in operating, at its lower back contact interrupts the hereinbefore-traced operating circuit for driving magnet RF; at its lower front contact closes an operating circuit for relay De; and at its upper back contact interrupts the hereinbefore-traced operating circuit for relay T, to prevent a well-known cross between characteristic contacts 2 and 3. The operating circuit for relay De may be traced from grounded battery through winding thereof, inner right front contact of relay O, through lower front contact of relay T1, inner right front contact of relay Pb, and thence to ground through back contact of relay T. The operation of relay De, which is also slow to operate, characterizes the busy condition of the called line. It is thus to be seen that the operation of relays De and Fs ensures the progression of the connection according to the manner peculiar to the switching system employed.

In the circuit of Fig. 4, means are likewise shown for preventing faulty operation of the system in the hunting of a P. B. X line. In effect, the problem of a P. B. X line amounts, generally speaking, to connecting a relay to the *d* contacts of intermediate lines in order to ensure the stopping of the final selector in case one of these lines is available, and to connecting a relay to the final line of the group in order to prevent the final selector from continuing the hunting over the next lines.

When two relays of one and the same control circuit that are fed by one or two individual sources are connected to two of the wires that are common to the other control circuits, it is known that false operating paths may be closed for these relays. This faulty operation is shown in Fig. 5. In this figure, it is assumed that the selector controlled by circuit A is on an intermediate P. B. X line (line contact 2), while the final selector controlled by circuit B reaches the final line (line contact 3) of the group. Relay T1 of circuit B operates, which is proper, but over the following path: from positive terminal of source S of circuit B, over conductor 50, through wiper *d* of the final selector controlled by circuit B, line contact 3, and in parallel paths over conductor 52, rectifier 54, winding of relay T1, negative and positive terminals of source S of circuit A, wiper *d* of the final selector controlled by circuit A, line contact 2, conductor 56, rectifier 58, and thence over winding of relay T of circuit B to negative terminal of source S of circuit B; and over the other path via conductor 60, rectifier 62 and winding of relay T1 to negative terminal of source S of circuit B. Relay T1 of circuit A thus operates wrongly, signaling to circuit A the arrival of the final selector over the final P. B. X line. This wrong operation is caused by the connection between the two relays T and T1 of the circuit that controlls the final selector opening into the final line of the group (contact 3).

To eliminate this drawback, a feature of the invention provides, as shown in Fig. 4, that relay T1, on operating, will disconnect its relay T; in this way a wrong pulling up of relay T1 of circuit A can be only momentary during the pulling up time of relay T1 of circuit B.

Another arrangement consists in energizing relays T and T1 from two current sources, each different from the other and in opposition. This arrangement is shown in Fig. 6, wherein relay T is supplied by source S1 and relay T1 is supplied by source S2. These two current sources are oriented so that the direction of the current that crosses relay T will be in opposition to that crossing relay T1. Relays T1 and T are respectively polarized by rectifier cells 64 and 66, and it is thus obvious that with such a device the wrong operation of relay T1 becomes impossible.

The devices hereinbefore-described are obviously not limitative and numerous modifications and adaptations may be made to them without departing from the scope of the invention, as defined by the appended claims.

What is claimed is:

1. In an automatic telephone system, a register, a calling line including a conductor connected to a predetermined point in said register, means at said predetermined point in said register for imparting a distinguishing characteristic of the type of calling line to said conductor, means including a switching mechanism for connecting said predetermined point to another point in said register with said distinguishing characteristic to indicate the type of calling line, means in said register including a source of potential for imparting a busy condition to said calling line, and means including a second source of potential in said register for detecting said predetermined point, said second source being independent of said first source of potential.

2. In an automatic telephone system, a register, a calling line having a conductor connected to a predetermined point in said register, a called line having a conductor also connected to said predetermined point in said register, switching mechanism for interconnecting said calling and called lines, means for characterizing said one conductor of said calling and called lines with distinguishing characteristics, means including a source of potential for imparting a busy condition to said conductors, and means including a second source of potential in said register for detecting the distinguishing characteristic imparted to said calling line to indicate the type of calling line, said second source being independent of said first source of potential.

3. In an automatic telephone system, a calling line, a conductor in said line adapted to characterize said line as one of a plurality of different types, a register, switching mechanism for interconnecting said line conductor and said register, means in said register adapted to be connected to said conductor for imparting a plurality of predetermined characteristics thereto, means including a relay and an individual source of potential associated with said register for detecting the characteristic imparted to said conductor, and means responsive to said relay for identifying the type of calling line.

4. In an automatic telephone system, a calling line, a conductor in said line adapted to characterize said line as one of a plurality of different types, a register, switching mechanism for interconnecting said line conductor and said register, means in said register adapted to be connected directly to said line conductor, anterior to said mechanism, for imparting a plurality of predetermined characteristics thereto, means including an individual source of potential and a relay associated with said register for detecting the characteristic imparted to said conductor, and means including a second relay responsive to said preceding relay for identifying the type of calling line, whereby said register is assured of a particular operation.

5. In an automatic telephone system; a calling line; a conductor in said line adapted to characterize said line as one of a plurality of different types, a register, line finder mechanism for seizing said line and for interconnecting said line conductor and said register; means in said register adapted to be connected directly to said conductor, anterior to said mechanism, for imparting a plurality of predetermined characteristics thereto; means including a source of potential connected to said conductor, posterior to said mechanism, for imparting a busy condition to said line; means including an individual source of potential, independent of said first source of potential, and a relay associated with said register for detecting the characteristic imparted to said conductor; and means including a second relay responsive to said preceding relay for identifying the type of calling line, whereby said register is assured of a particular operation.

6. In an automatic telephone system, a plurality of calling lines, a conductor in each of said lines adapted to characterize each of said lines as one of a plurality of types, a register, line finder switching mechanism for seizing said conductors and for interconnecting each of said line conductors and said register, means adapted to be connected directly to said conductors for imparting a predetermined characteristic to each of said conductors, means including a relay and an individual source of potential associated with said register for detecting the characteristic imparted to each of said conductors, means responsive to said preceding means for identifying the type of called line, whereby said register is assured a particular operation, means including a second source of potential for making each of said line conductors busy when seized by said mechanism, and rectifier means serially disposed with said second source of potential for preventing interconnection between two of said line conductors.

7. In an automatic telephone system, a called line, a conductor in said line adapted to characterize said line as one of a plurality of types, a register, switching mechanism for connecting said line conductor with a predetermined point in said register, means at another predetermined point in said register adapted to be connected directly to said conductor for imparting one of a plurality of predetermined characteristics thereto, means including a relay and an individual source of potential connected serially to said points in said register for detecting the characteristic imparted to said conductor, and means responsive to said relay for identifying the type of called line.

8. In an automatic telephone system, a called line, a conductor in said line adapted to characterize said line as one of a plurality of types, a register, selector switching mechanism for connecting said line conductor with a predetermined point in said register, means at another predetermined point in said register adapted to be connected directly to said conductor for imparting one of a plurality of predetermined characteristics thereto, means including a relay and an individual source of potential interposed serially between said points in said register for detecting the characteristic imparted to said conductor, means responsive to said preceding means for identifying the type of called line, whereby said register is assured a particular operation, and means including a rectifier for preventing false operation of said relay.

9. In an automatic telephone system, a called line, a conductor in said line adapted to characterize said line as one of a plurality of types, a register, selector switching mechanism for interconnecting said line conductor and said register, means adapted to be connected to said line conductor for imparting a predetermined one of a plurality of characteristics thereto, means including a relay and an individual source of energy associated with said register for detecting the characteristic imparted to said conductor, switching means for connecting said relay step-by-step with said characteristics, and means responsive to said relay for identifying the type of called line, whereby said register is assured a particular operation.

10. In an automatic telephone system, a called line, a conductor in said line adapted to characterize said line as one of a plurality of types, a register, selector switching mechanism for interconnecting said line conductor and said register, means adapted to be connected to said line conductor for imparting a predetermined one of a plurality of characteristics thereto, means including a relay and an individual source of energy associated with said register for detecting the characteristic imparted to said conductor, switching means for connecting said relay step-by-step with said characteristic means, means responsive to said relay for identifying the type of called line, whereby said register is assured a particular operation, and rectifier means in series with said relay for preventing false operation thereof.

11. In an automatic telephone system, a called line, a conductor in said line adapted to characterize said line as one of a plurality of types, a register, switching mechanism for interconnecting said line conductor and said register, means adapted to be connected to said line conductor for imparting a predetermined one of a plurality of characteristics thereto, means including a relay and an individual source of energy associated with said register for detecting the characteristic imparted to said conductor, means including a second relay for connecting said first relay with said line conductor, switching means responsive to said second relay for connecting said first relay step-by-step with said characteristic means, and means responsive to said first relay for identifying the type of called line, whereby said register is assured of a particular operation.

12. In an automatic telephone system, a called line including a group of P. B. X lines, a conductor adapted to characterize said line as one of a plurality of types of lines, a register, switching mechanism including a final selector for interconnecting said line conductor and said register, means adapted to be connected to said line conductor for imparting a predetermined one of a plurality of characteristics thereto, means including an individual source of energy and a relay associated with said register for detecting the characteristic imparted to said conductor, a second relay including a rectifier for detecting a busy characteristic in said group of P. B. X lines, means responsive to said second relay for enabling said selector to hunt for a free line in said P. B. X group, and means including a third relay for controlling operation of said first relay.

13. In an automatic telephone system, a called line including a group of P. B. X lines, a conductor adapted to characterize said line as one of a plurality of types of lines, a register, switching mechanism including a final selector for interconnecting said line conductor and said register, means adapted to be connected to said line conductor for imparting a predetermined one of a plurality of characteristics thereto, means including a relay and an individual source of energy for detecting the characteristic imparted to said conductor, a second relay including a rectifier for detecting a busy characteristic in said group of P. B. X lines, means responsive to said second relay for enabling said final selector to hunt for a free line in said P. B. X group, and means including a third relay and individual source of energy for controlling operation of said first relay, said sources of potential being oppositely poled with respect to each other.

14. In an automatic telephone system, a called line including a group of P. B. X lines, a conductor adapted to characterize said line as one of a plurality of types of lines, a register, switching mechanism including a final selector for interconnecting said line conductor and said register, means adapted to be connected to said line conductor for imparting a predetermined one of a plurality of characteristics thereto, means including an individual source of energy and a relay associated with said register for detecting the characteristics imparted to said conductor, a second relay including a rectifier for detecting a busy characteristic in said group of P. B. X lines, means responsive to said second relay for enabling said selector to hunt for a free line in said P. B. X group, means including a third relay for controlling operation of said first relay, and means responsive to said third relay for stopping said final selector in the event that one of said lines in said P. B. X group is available.

PIERRE CHARLES BOREL.
MARCEL ROGER MAUGE.

REFERENCES CITED

The following references are of record in the file of this patent:

UNITED STATES PATENTS

| Number | Name | Date |
|---|---|---|
| 2,211,159 | Pfannschmidt | Aug. 13, 1940 |